US012579383B2

(12) United States Patent
Wang et al.

(10) Patent No.: US 12,579,383 B2
(45) Date of Patent: Mar. 17, 2026

(54) VERIFYING TRANSLATIONS OF SOURCE TEXT IN A SOURCE LANGUAGE TO TARGET TEXT IN A TARGET LANGUAGE

(71) Applicant: INTERNATIONAL BUSINESS MACHINES CORPORATION, Armonk, NY (US)

(72) Inventors: Der-Joung Wang, New Taipei (TW); Chan Gao, Beijing (CN); Bai Xin Jiang, Beijing (CN); Min Kang Zhang, Beijing (CN); Xiao Lei Jia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 18/492,524

(22) Filed: Oct. 23, 2023

(65) Prior Publication Data

US 2025/0131210 A1     Apr. 24, 2025

(51) Int. Cl.
G06F 40/51 (2020.01)
G06F 40/45 (2020.01)

(52) U.S. Cl.
CPC .............. G06F 40/51 (2020.01); G06F 40/45 (2020.01)

(58) Field of Classification Search
None
See application file for complete search history.

(56) References Cited

U.S. PATENT DOCUMENTS 8,296,124 B1    10/2012  Holsztynska et al.
9,529,797 B2    12/2016  Shoshan et al.

10,810,379 B2   10/2020  Zeng et al.
10,936,827 B1 *  3/2021  Gupta ..................... G06F 40/45
11,048,886 B2    6/2021  Saeki
11,481,562 B2 * 10/2022  Xiong ................... G06F 40/289
2010/0274552 A1 * 10/2010  Gao ........................ G06F 40/51
                                                                      704/2
2011/0184722 A1 *  7/2011  Sneddon ................ G06Q 10/06
                                                                      704/7
2014/0114642 A1 *  4/2014  van den Oever ....... G06F 40/44
                                                                      704/2
2014/0358519 A1 * 12/2014  Mirkin ................... G06F 40/47
                                                                      704/2

(Continued)

FOREIGN PATENT DOCUMENTS

CN        102073694 B      5/2011
JP        2023058045 A     4/2023

*Primary Examiner* — Douglas Godbold

(74) *Attorney, Agent, or Firm* — Konard, Raynes, Davda & Victor LLP; David Victor

(57) ABSTRACT

Provided are a computer program product, system, and method for verifying translations of text in a source language to target text in a target language. A source similarity score is calculated indicating a similarity between a first text and second text in a source language. A target similarity score is calculated between translated first text, comprising a translation of the first text in a target language, and translated second text, comprising a translation of the second text in the target language. A determination is made whether the translation of the first text to the translated first text is of an inappropriate translation quality based on the source similarity score and the target similarity score. Indication is made of indicating the inappropriate translation quality in response to determining the inappropriate translation quality.

20 Claims, 6 Drawing Sheets

(56)                    References Cited

U.S. PATENT DOCUMENTS

| | | | |
|---|---|---|---|
| 2014/0358524 A1* | 12/2014 | Papula | G06F 40/51 |
| | | | 704/9 |
| 2016/0267073 A1* | 9/2016 | Bahgat | G06F 40/134 |
| 2019/0236147 A1* | 8/2019 | Lee | G06F 40/47 |
| 2022/0108083 A1* | 4/2022 | Zydron | G06F 40/30 |
| 2023/0252245 A1* | 8/2023 | Johnson | G06F 40/51 |
| | | | 704/8 |
| 2024/0160860 A1* | 5/2024 | Lim | G06F 40/58 |
| 2024/0256795 A1* | 8/2024 | Ross | G06F 40/58 |

* cited by examiner

FIG. 1

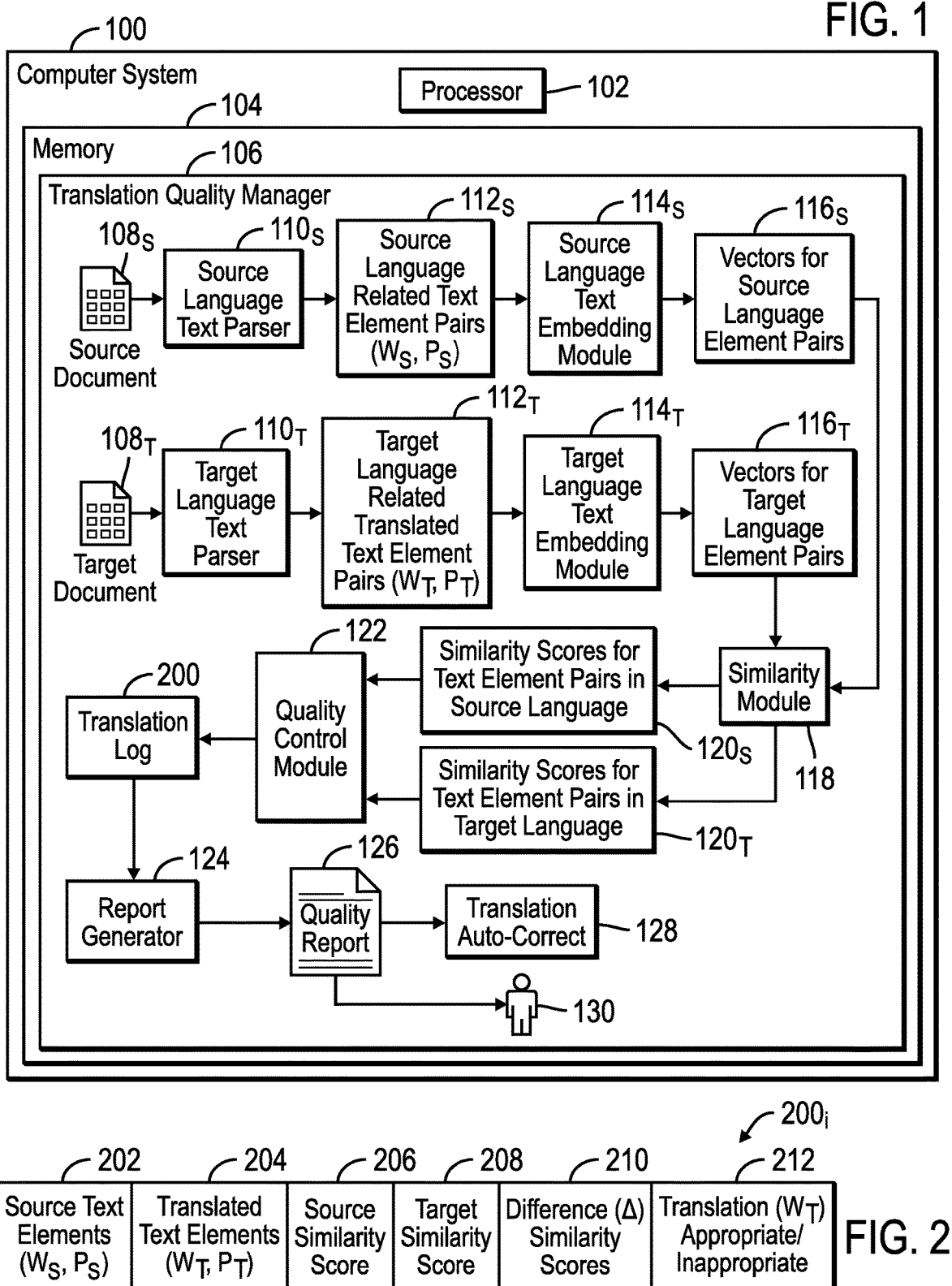

Computer System — 100

Processor — 102

Memory — 104

Translation Quality Manager — 106

Source Document — 108_S

Source Language Text Parser — 110_S

Source Language Related Text Element Pairs ($W_S$, $P_S$) — 112_S

Source Language Text Embedding Module — 114_S

Vectors for Source Language Element Pairs — 116_S

Target Document — 108_T

Target Language Text Parser — 110_T

Target Language Related Translated Text Element Pairs ($W_T$, $P_T$) — 112_T

Target Language Text Embedding Module — 114_T

Vectors for Target Language Element Pairs — 116_T

Similarity Module — 118

Similarity Scores for Text Element Pairs in Source Language — 120_S

Similarity Scores for Text Element Pairs in Target Language — 120_T

Quality Control Module — 122

Translation Log — 200

Report Generator — 124

Quality Report — 126

Translation Auto-Correct — 128

— 130

200_i

| Source Text Elements ($W_S$, $P_S$) | Translated Text Elements ($W_T$, $P_T$) | Source Similarity Score | Target Similarity Score | Difference ($\Delta$) Similarity Scores | Translation ($W_T$) Appropriate/ Inappropriate |
|---|---|---|---|---|---|
| 202 | 204 | 206 | 208 | 210 | 212 |

Translation Log Entry

FIG. 2

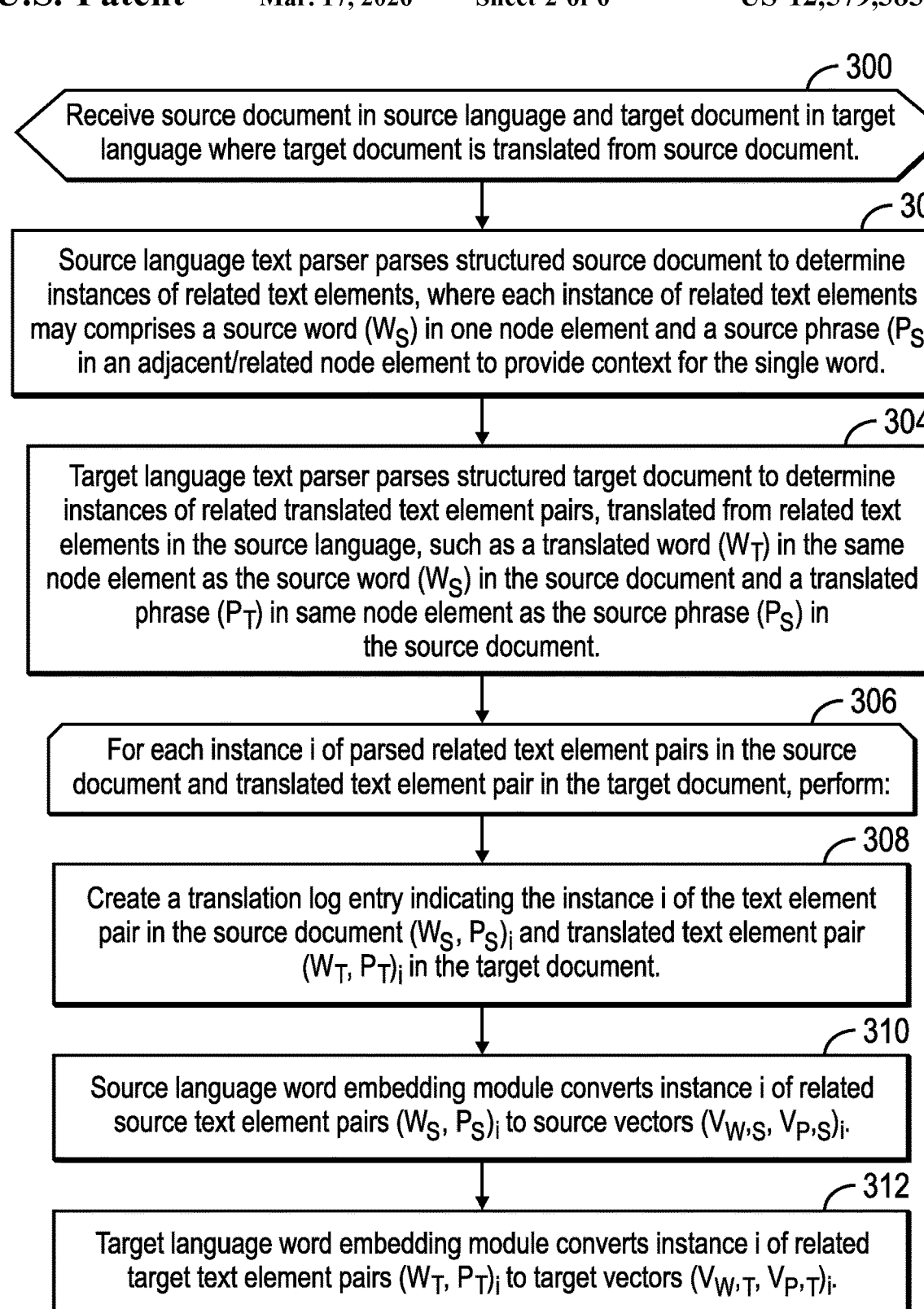

300

Receive source document in source language and target document in target language where target document is translated from source document.

302

Source language text parser parses structured source document to determine instances of related text elements, where each instance of related text elements may comprises a source word ($W_S$) in one node element and a source phrase ($P_S$) in an adjacent/related node element to provide context for the single word.

304

Target language text parser parses structured target document to determine instances of related translated text element pairs, translated from related text elements in the source language, such as a translated word ($W_T$) in the same node element as the source word ($W_S$) in the source document and a translated phrase ($P_T$) in same node element as the source phrase ($P_S$) in the source document.

306

For each instance i of parsed related text element pairs in the source document and translated text element pair in the target document, perform:

308

Create a translation log entry indicating the instance i of the text element pair in the source document $(W_S, P_S)_i$ and translated text element pair $(W_T, P_T)_i$ in the target document.

310

Source language word embedding module converts instance i of related source text element pairs $(W_S, P_S)_i$ to source vectors $(V_{W,S}, V_{P,S})_i$.

312

Target language word embedding module converts instance i of related target text element pairs $(W_T, P_T)_i$ to target vectors $(V_{W,T}, V_{P,T})_i$.

314

Go to block 316 in FIG. 3B.

FIG. 3A

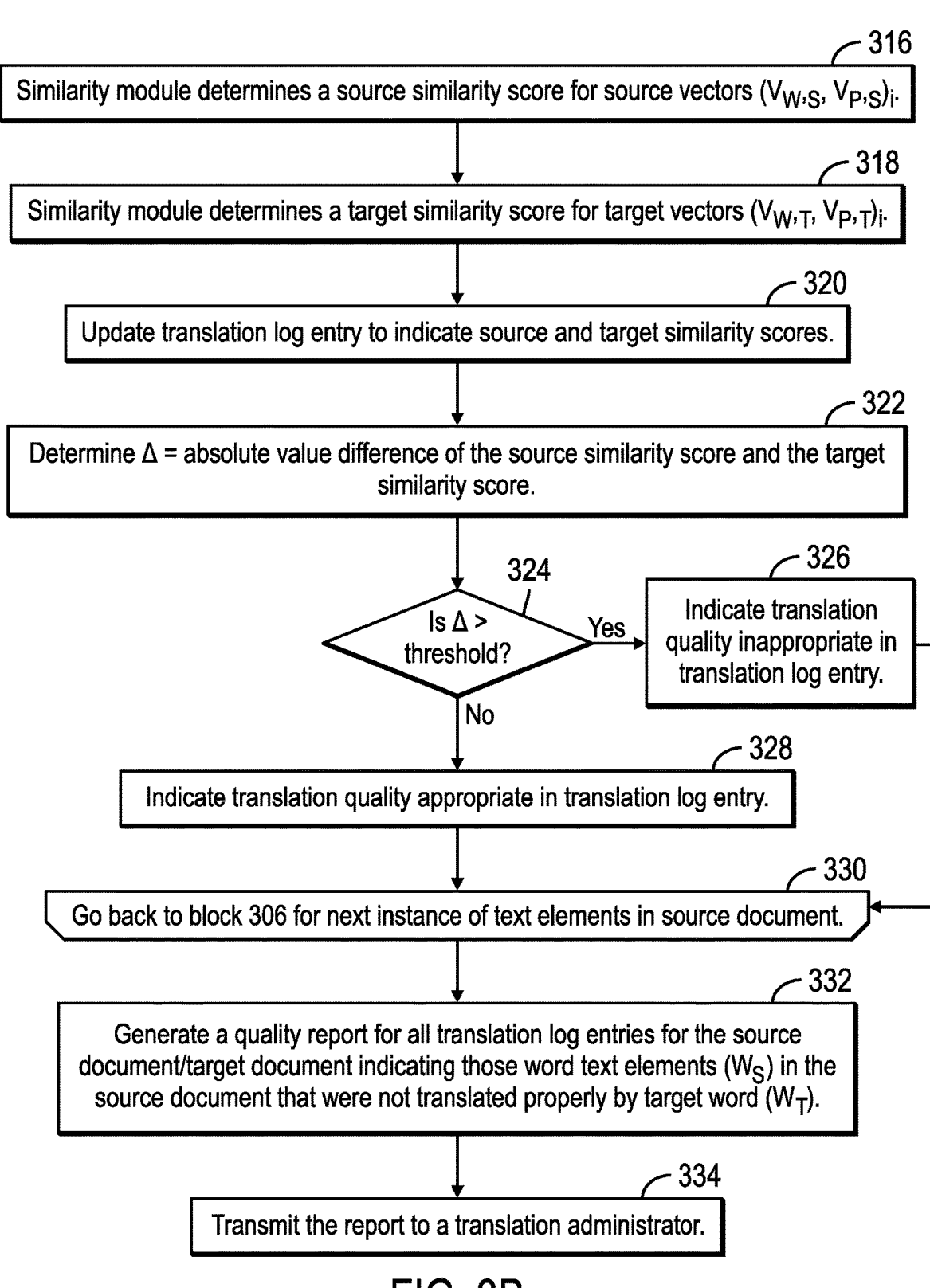

316

Similarity module determines a source similarity score for source vectors $(V_{W,S}, V_{P,S})_i$.

318

Similarity module determines a target similarity score for target vectors $(V_{W,T}, V_{P,T})_i$.

320

Update translation log entry to indicate source and target similarity scores.

322

Determine $\Delta$ = absolute value difference of the source similarity score and the target similarity score.

324

Is $\Delta$ > threshold?

326

Yes — Indicate translation quality inappropriate in translation log entry.

No

328

Indicate translation quality appropriate in translation log entry.

330

Go back to block 306 for next instance of text elements in source document.

332

Generate a quality report for all translation log entries for the source document/target document indicating those word text elements $(W_S)$ in the source document that were not translated properly by target word $(W_T)$.

334

Transmit the report to a translation administrator.

FIG. 3B

| | Word | Phrase | Similarity | |Delta| |
|---|---|---|---|---|
| 500s | Harden | Assess your environment's current weaknesses with Vulnerability Assessment and monitor changes that are made to your environment with Configuration Auditing System (CAS). — 502s | 504s 0.8659 | 0.1813 ~506 |
| 500R | 哈登 | 使用「漏洞評量」來評量您環境的現行缺點，並使用「配置審核系統 (CAS)」來監視對您環境所做的變更。— 502T | 504T 0.6846 | |
| 510s | Investigate | Monitor database activities and investigate suspicious — 512s activity in any part of your environment. | 508s 0.9230 | 0.0239 ~514 |
| 510T | 調查 | 監視資料庫活動，並調查您環境任何部分中的可疑活動。— 508T — 512T | 508T 0.8991 | |
| • Revision | | | | |
| 500s | Harden | Assess your environment's current weaknesses with Vulnerability Assessment and monitor changes that are made to your environment with Configuration Auditing System (CAS). — 502s | 504s 0.8659 | 0.0576 ~520 |
| 516R | 強化 | 使用「漏洞評量」來評量您環境的現行缺點，並使用「配置審核系統 (CAS)」來監視 對您環境所做的變更。— 502T | 518T 0.8082 | |

VERIFYING TRANSLATIONS OF SOURCE TEXT IN A SOURCE LANGUAGE TO TARGET TEXT IN A TARGET LANGUAGE

BACKGROUND OF THE INVENTION

1. Field of the Invention

The present invention relates to a computer program product, system, and method for verifying translations of text in a source language to target text in a target language.

2. Description of the Related Art

Natural Language Processing (NLP) analyzes words, grammar, and context of words in a sentence to translate the text. In this way, an NLP translator can resolve multiple translations of a word from a source language to target language by considering the context and other surrounding words in a sentence. After translating a source language document, including web pages and other types of documents, the translated web pages are reviewed to ensure that the translations of words and sentences are adequate.

SUMMARY

Provided are a computer program product, system, and method for verifying translations of text in a source language to target text in a target language. A source similarity score is calculated indicating a similarity between a first text and second text in a source language. A target similarity score is calculated between translated first text, comprising a translation of the first text in a target language, and translated second text, comprising a translation of the second text in the target language. A determination is made whether the translation of the first text to the translated first text is of an inappropriate translation quality based on the source similarity score and the target similarity score. Indication is made of indicating the inappropriate translation quality in response to determining the inappropriate translation quality.

BRIEF DESCRIPTION OF THE DRAWINGS

FIG. 1 illustrates an embodiment of a system for validating translations of a document.

FIG. 2 illustrates an embodiment of a translation log entry providing information on a translation of a word in a source document in a target document.

FIGS. 3A and 3B illustrate an embodiment of operations to confirm the appropriateness of translations of words in a structured source document in a source language with translated words in a structured target document in a target language.

FIGS. 4 and 5 illustrate examples of the translation verification operation with respect to the source document and the translated target document.

DETAILED DESCRIPTION

Figure 4:
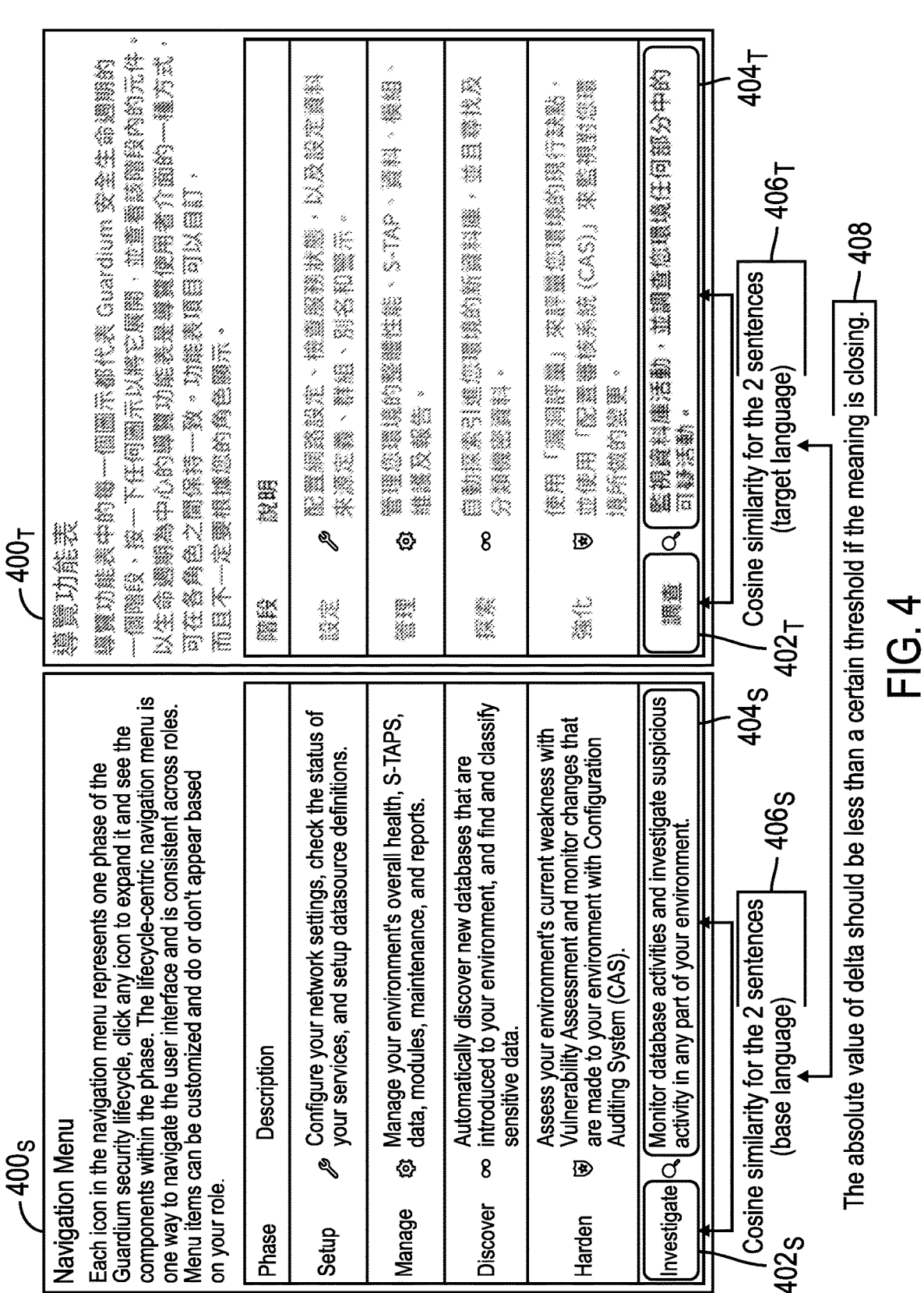

Certain types of structured documents, such as Extended Markup Language (XML) files, have separate nodes or elements in a page, where each node element may have text and numerical values or links to a source file of content to embed in the node element. Certain cells or document nodes may have just a single word to translate and others may have a sentence or full phrase. Translating a single word in a node element without the context of surrounding words in a phrase or sentence may result in wrong translations because a stand-alone word may have multiple meanings and context is needed to resolve to the best translation of a word. Current translation of structured documents may not consider the context of related node elements in translating the single word. Further, there can be inconsistencies or errors in the final translated XML document if several source files are translated individually before being integrated to create a page without testing. Having a person review the translation of all the content in a large-scale website may be extremely time consuming and expensive.

Described embodiments provide improvements to computer technology to verify the translations of text in structured documents by examining node elements in a structured document that have a single word, and then comparing the similarity of the single word in a node element to a related or nearby node element content that may provide context for a single word node element. For instance, in an XML document representing a table, there are separate node elements for each cell, i.e., column and row, in the table. Described embodiments may determine the similarity of a single word in a column of a row node element with the text in an adjacent column in the same row. Described embodiments determine the similarity of a single word text in a node element in the source document in a source language with a phrase in an adjacent or related node element in the source language, such as using cosine similarity. To verify the translation of words in a target document comprising a translation of the source document in a target language, described embodiments determine a similarity of the translated word, corresponding to the single word in the source document, to the translated phrase in an adjacent node in the target document that corresponds to the context phrase considered in the source document. The similarity scores between the single word and phrase in the source document and the translated target document are compared. If the translated word has a similarity score that is sufficiently different than the similarity score for the source language word, then the translation is determined to be inappropriate and corrective action may be taken. If the translated single word is correct, then it would have a similar similarity score with a related/adjacent phrase in another node element to the similarity score of the source word and context phrase. Significant differences in the source and target similarity scores indicate the translated word is not appropriate.

With described embodiments, a translated single word not having a similarity score with the context phrase in an adjacent node that is close to the similarity score between the source language word and source language context phrase, may be flagged as inappropriate. This allows for flagging of automated translations of single words throughout a structured document that are potentially inappropriate for further review by a person or auto-correction by a correction program.

FIG. 1 illustrates an embodiment of a computer system 100 in which embodiments are implemented. The system 100 includes a processor 102 and a main memory 104. The main memory 104 includes a translation quality manager 106 that receives a source document 108$_S$ in a source language and a target document 108$_T$ comprising a translation of the source document 108 in a target language. The source document 108$_S$ may comprise a structured document, such as an Extended Markup Language (XML) document, having XML element nodes representing elements of the documents that provide values for an element node, such as text or a number value. The source document $108_S$ may include a table having element nodes representing rows and columns of rows in the table. The target document $108_T$ may comprise a copy of the document structure of the source document $108_S$, such as the same nodes and elements, and provide translation of the element values from the source language to the target language for the node elements.

A source language text parser $110_S$ may extract text from the node elements in the defined node elements in the source document $108_S$ and a target language text parser $110_T$ may extract text from the node elements in the defined node elements in the target document $108_T$. For instance, in XML implementation, the parsers $110_S$, $110_T$ may use the XPATH syntax path expressions to traverse the node elements of the documents $108_T$, $108_T$ to extract text from the node elements. There may be language text parsers $110_i$ for numerous different languages to extract text content from node elements in a source and target document in various languages.

The source language text parser $110_S$ may determine multiple instances of related source text element pairs $112_S$ ($W_S$, $P_S$) in the source document $108_S$ comprising a single word ($W_S$) in a node element and then a phrase ($P_S$) in a node element closest or adjacent to the node element having the single word. The phrase may comprise an expression comprising a group of words acting as a grammatical unit, such as a sentence. The phrase may be in an element node closest to the word element node in a hierarchical relationship of the node elements, such as the word node element and phrase node element may comprise adjacent columns in a row of a table, or the phrase node element is likely to provide context for the single word element node. The target language text parser $110_T$ may output target language related translated text elements $112_T$ comprising pairs of text elements ($W_T$, $P_T$), each pair comprising a word and related phrase in the target language, to provide context for the word, translated from the corresponding word and related phrase in the source language. Each translated word and phrase pair ($W_T$, $P_T$) $112_T$ may be in the same node elements in the target document $108_T$ as the word and phrase pair ($W_S$, $P_S$) $112_S$ in the source document $108_S$ that were translated to produce the translated word and phrase pair ($W_T$, $P_T$), where the phrase (P) provides context for the word (W).

In further embodiments, the text element pair may comprise first text and second text, where the first text and the second text may comprise a phrase of one or more words, and wherein the second text is to provide context for verifying the first text. In this way, described embodiments may verify first text comprising a word or phrase with context second text.

The source language text element pairs ($W_S$, $P_S$) $112_S$ are inputted into a source language text embedding module $114_S$, specific to the source language, that produces vectors ($V_{W,S}$, $V_{P,S}$) $116_S$ providing a numerical representation of the source text element pairs ($W_S$, $P_S$), where for a $V_{i,j}$, the i variable indicates whether the text that is vectorized is for a word (W) or phrase (P) and the j indicates whether the text that is vectorized is from the source(S) or target (T) document. Likewise, the target language text element pairs $112_T$ are inputted into a target language text embedding module $114_T$, specific to the target language, that produces vectors ($V_{W,T}$, $V_{P,T}$) $116_T$ providing numerical representations for the target text element pairs ($W_T$, $P_T$). There may be text embedment modules $114_i$ for numerous different languages $_i$ to convert text, comprising a word or phrase, to a vector for different languages.

The text embedding module $114$; may be implemented as a deep neural network to produce embedded vectors from input text. In certain embodiments, the outputted vectors ($V_{W,S}$, $V_{P,S}$) $116_S$ and ($V_{W,T}$, $V_{P,T}$) $116_T$ may have a same dimensionality to allow for comparison of the measurements. The text embedding modules $114_S$, $114_T$ may utilize text embedding algorithms such as, but not limited to, Word2vec, Glove, Explicit Semantic Analysis, FastText, etc.

For each of the source language text element pairs $114_S$ and target language text element pairs $114_T$, a similarity module $118$ calculates a source similarity score $120_S$, from the vectors $V_{W,S}$, $V_{P,S}$, representing a relatedness of a pair of source language text elements, e.g., $W_S$ and $P_S$. The similarity module $118$ further calculates a target similarity score $120_T$, from the vectors $V_{W,T}$, $V_{P,T}$, representing a similarity of a pair of target language text elements, e.g., $W_T$ and $P_T$.

In one embodiment, the similarity module $118$ may use a cosine similarity function to calculate a similarity score between two vectors comprising the cosine of an angle ($\theta$) between the two vectors, $V_{W,j}$ and $V_{P,j}$, which is calculated according to equation (1) below as:

$$\frac{V_{W,j} \bullet V_{P,j}}{\|V_{W,j}\| \|V_{P,j}\|} \tag{1}$$

Other techniques and equations may be used to determine a similarity score between a pair of vectors representing text elements or the text elements themselves.

A quality control module $122$ uses the similarity scores $120_S$ and $120_T$, calculated for source text elements and translated text elements, to determine whether the translation of the word ($W_T$) is inappropriate/unacceptable. For instance, if the difference between source $120_S$ and corresponding target similarity scores $120_T$ exceeds a threshold, then this difference of similarities indicates the translated word is not correct because its similarity to the context phrase is not sufficiently similar to the similarity score $120_S$ of the source word ($W_S$) and its context phrase ($P_S$). For instance, if the translated word ($W_T$) was a correct translation of the source word ($W_S$) than the similarity score $120_T$ of the translated word ($W_T$), as compared to the translated context phrase ($P_T$), would be comparable to the similarity score $120_S$ of the source word ($W_S$) and the source context phrase ($P_S$). If the quality control module $122$ determines that the similarity scores $120_S$, $120_T$ are significantly different, then the quality control module $122_S$ would indicate, in an entry in a translation log $200$, for the source text word ($W_S$), that the quality of the translated word ($W_T$) is inappropriate or incorrect.

After processing all the parsed text element pairs, e.g., word and context phrase pairs, the report generator $124$ may render a quality report $126$, based on the translation log $200$, indicating translated words ($W_T$) that are inappropriate for the source word ($W_S$). The quality report $126$ may be forwarded to a translation auto-correct $128$ program to automatically correct the inappropriately translated word in the target document $108_T$ or to a language administrator $130$ to correct those translated words ($W_T$) flagged as incorrect.

The memory $104$ may comprise suitable volatile or non-volatile memory devices known in the art. For instance, The memory $104$ may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (Efram), nanowire-based non-volatile memory, and Direct In-Line Memory Modules (DIMMs), NAND storage, e.g., flash memory, Solid State Drive (SSD) storage, non-volatile RAM, etc.

Generally, program modules, such as the program components $110_S$, $110_T$, $114_S$, $114_T$, 118, 122, 124, and 128, among others, may comprise routines, programs, objects, components, logic, data structures, and so on that perform particular tasks or implement particular abstract data types. The program components and hardware devices of the system 100 may be implemented in one or more computer systems, where if they are implemented in multiple computer systems, then the computer systems may communicate over a network.

The program components $110_S$, $110_T$, $114_S$, $114_T$, 118, 122, 124, and 128, among others, may be accessed by the processor 102 from the memory 104 to execute. Alternatively, some or all of the program components $110_S$, $110_T$, $114_S$, $114_T$, 118, 122, 124, and 128 may be implemented in separate hardware devices, such as Application Specific Integrated Circuit (ASIC), Field Programmable Gate Arrays (FPGAs) and other hardware devices.

The functions described as performed by the program components $110_S$, $110_T$, $114_S$, $114_T$, 118, 122, 124, and 128, among others, may be implemented as program code in fewer program modules than shown or implemented as program code throughout a greater number of program modules than shown.

Certain of the components, such as the text embedding module $114_S$, $114_T$, may use machine learning algorithms, such as deep learning algorithms, and natural language processor (NLP) algorithms to process text to produce a vector comprising a numerical representation of the text.

The arrows shown in FIG. 1 between the components in the memory 104 represent a data flow between the components.

FIG. 2 illustrates an embodiment of a translation log entry 200; including information generated and used by the translation quality manager 106 to determine whether a translation ($W_T$) of a word ($W_S$) is appropriate or inappropriate, and includes: a pair of source text elements ($W_S$, $P_S$) 202 and translated text elements ($W_T$, $P_T$) 204; a source similarity score 206 indicating a similarity of the source text elements 202; a target similarity score 208 indicting a similarity of the target text elements 204; a difference ($\Delta$) 210 of the similarity scores 206, 208; and indication whether the translated word ($W_T$) is appropriate or inappropriate 212.

FIGS. 3A and 3B illustrate an embodiment of operations performed by the translation quality manager 106 and components to determine whether translations of words from a source document $108_S$ in a target document $108_T$ are appropriate or inappropriate and need to be fixed. Upon receiving (at block 300) a source document $108_S$ in a source language and a target document $108_T$ in a target language, where the target document $108_T$ is a translation of the source document $108_S$, the source language text parser $110_S$ parses (at block 302) the structured source document $108_S$ to determine instances of related text element pairs ($W_S$, $P_S$) $112_S$. Each instance i of related text element pairs ($W_S$, $P_S$)$_i$$112_S$ may comprise a source word ($W_S$) in one node element and a source phrase ($P_S$) in an adjacent or related node element to provide context for the single word ($W_S$). A word ($W_S$) may comprise a combination word or single string word that defines one term. The target language text parser $110_T$ parses (at block 304) the structured target document $108_T$ to determine instances of related translated text element pairs $112_T$ translated from related text elements in the source language, such as a translated word ($W_T$) in the same node element as the source word ($W_S$) in the source document $108_S$, and a translated phrase ($P_T$) in same node element as the source phrase ($P_S$) in the source document $108_S$.

A loop of operations is performed at blocks 306 through block 330 (FIG. 3B) for each instance i of related source text element pairs $112_S$ in the source document $108_S$ and corresponding translated text element pairs $112_T$ in the target document $108_T$. At block 308, the translation quality manager 106 creates (at block 308) a translation log entry 200; indicating in field 202 instance i of text element pairs ($W_S$, $P_S$)$_i$ $112_S$ in the source document and the corresponding translated text element pair ($W_T$, $P_T$)$_i$ translated from the instance i of source text element pair ($W_S$, $P_S$)$_i$. The source language word embedding module $114_S$ converts (at block 310) the instance i of source text element pair ($W_S$, $P_S$)$_i$ to a numerical representation comprising source vector pair ($V_{W,S}$, $V_{W,P}$)$_i$ $116_S$. The target language word embedding module $114_T$ converts (at block 312) instance i of related target text element pairs ($W_T$, $P_T$)$_i$ to target vectors ($V_{W,T}$, $V_{P,T}$)$_i$ $116_T$.

Control proceeds (at block 314) to block 316 in FIG. 3B where the similarity module 118 module determines a source similarity score $120_S$ for source vectors ($V_{W,S}$, $V_{P,S}$)$_i$ $116_S$, such as a cosine similarity. The similarity module 118 further determines (at block 318) a target similarity scores for target vectors ($V_{W,T}$, $V_{P,T}$)$_i$ $120_T$, such as a cosine similarity. The translation quality manager 106 updates (at block 320) a translation log entry 200$_i$ to indicate the source $120_S$ and target 120 similarity scores in fields 206 and 208, respectively. The quality control module 112 determines (at block 322) a delta ($\Delta$) comprising an absolute value of the difference of the source similarity score $120_S$ and the target similarity score $120_T$. If (at block 324) the delta ($\Delta$) is greater than a threshold, then the similarity scores $120_S$ and $120_T$ are not sufficiently similar indicating the translated word ($W_T$) may not be an appropriate translation of the source word ($W_S$). In such case, the translation quality in field 212 of the translation log entry 200; is indicated (at block 326) as inappropriate. If (at block 324) the delta ($\Delta$) does not exceed the threshold, then the target text element pair has a similar similarity to the source text element pair, indicating the translated word ($W_T$) is properly translated, and the quality of appropriate is indicated (at block 328) in field 212. Control then proceeds (at block 330) back to block if there are further instances of source and target text element pairs to consider. After creating translation log entries 200; for all the determined source $112_S$ and target $112_T$ text element pairs, the report generator 124 may generate (at block 332) a quality report 132 for all translation log entries 200; for the source document/target document indicating those word text elements ($W_S$) in the source document $108_S$ that were not translated properly into translated word ($W_T$). The quality report 126 is transmitted (at block 334) to translation auto-correct 128 to locate an alternative translation of those words ($W_S$) indicated as inappropriately translated or transmit the report 126 to a user 130 to manually fix the translated word ($W_T$).

In certain embodiments, the translation auto-correct 128 may determine an alternative translated word ($W'_T$), vectorize the alternative translated word, and then perform the operations at blocks 316-328 with respect to the alternative translated word ($W'_T$), as done with respect to the translated word ($W_T$), to determine whether the alternative translated word is appropriate or inappropriate given the context of the translated phrase ($P_T$), a recalculated target similarity score $120_T$ and comparison to the source similarity score $120_S$, providing the baseline of the similarity between the source word and context phrase.

With the embodiment of FIGS. 3A and 3B, translated words ($W_T$) are verified for quality by determining a context phrase ($P_T$), such as in a node element in the target document $108_T$ having a phrase ($P_T$) that is related to the node element having the translated word ($W_T$) in the target language. The similarity of the translated word and context phrase in the translated target document $108_T$ is compared to a similarity score between the source word and context source phrase, which provides a suitable baseline for an acceptable similarity between the word ($W_S$) and the phrase ($P_S$). If the target similarity $120_T$ is sufficiently similar to the source similarity score $120_S$, such as the delta ($\Delta$) is below a predetermined threshold, then the translated word is likely appropriate because it has a similarity score with its context phrase ($P_S$) that is in-line with the similarity score between the source word ($W_S$) and its context phrase ($P_S$). If the delta ($\Delta$) exceeds the threshold, then the similarity between the translated word ($W_T$) and its context phrase ($P_T$) is not in-line or similar to the source similarity score $120_S$, which indicates a discrepancy in the translated word ($W_T$) with respect to its context phrase ($P_T$). In this way, described embodiments provide a methodology to verify a translated word that may have been initially translated without context because the word is in a separate node element, and not part of a phrase or sentence of words.

FIG. 4 provides an illustrative example of how in the English language source document $400_S$, the source word $402_S$ is compared to the source phrase $404_S$ to determine a source cosine similarity score $406_S$. For the corresponding node elements of the same table in the Chinese language target document $400_T$, the translated word $402_T$ is compared to the translated phrase $404_T$ in Chinese to determine a target cosine similarity score $406_T$. The delta 408 is determined as the absolute value of the difference of the source cosine similarity score $406_S$ and the target cosine similarity score $406_T$, and used to determine whether the translated word $402_T$ is appropriate.

FIG. 5 provides an example of similarity scores and deltas. For instance, a source word $500_S$ "Harden" is compared to a source context phrase $502_S$ to determine a cosine similarity $504_S$. The translated word $500_T$ and translated phrase $502_T$ yield a cosine similarity $504_T$. A difference delta ($\Delta$) 506 of the cosine similarities $504_S$ and $504_T$ is determined, which is unacceptably high. The example further shows that a source similarity score $508_S$ is calculated from the source word "Investigate" $510_S$ and source context phrase $512_S$, and the target similarity score $508_T$ is calculated from the translated word $510_S$ and target context phrase $512_T$. The delta 514 between the similarity scores $508_S$ and $508_T$ is sufficiently low to indicate the translated word $510T$ is acceptable.

FIG. 5 further shows how an alternative translated word $516_T$ may be determined for the source word $500_S$ "harden", and a new similarity score $518_T$ is determined for the alternative translated word $516_T$ and the target context phrase $502_T$. The delta 520 between the source similarity score $504_S$ and the alternative target similarity score $514_T$ is sufficiently low such that this new alternative translated word $512_T$ is appropriate.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
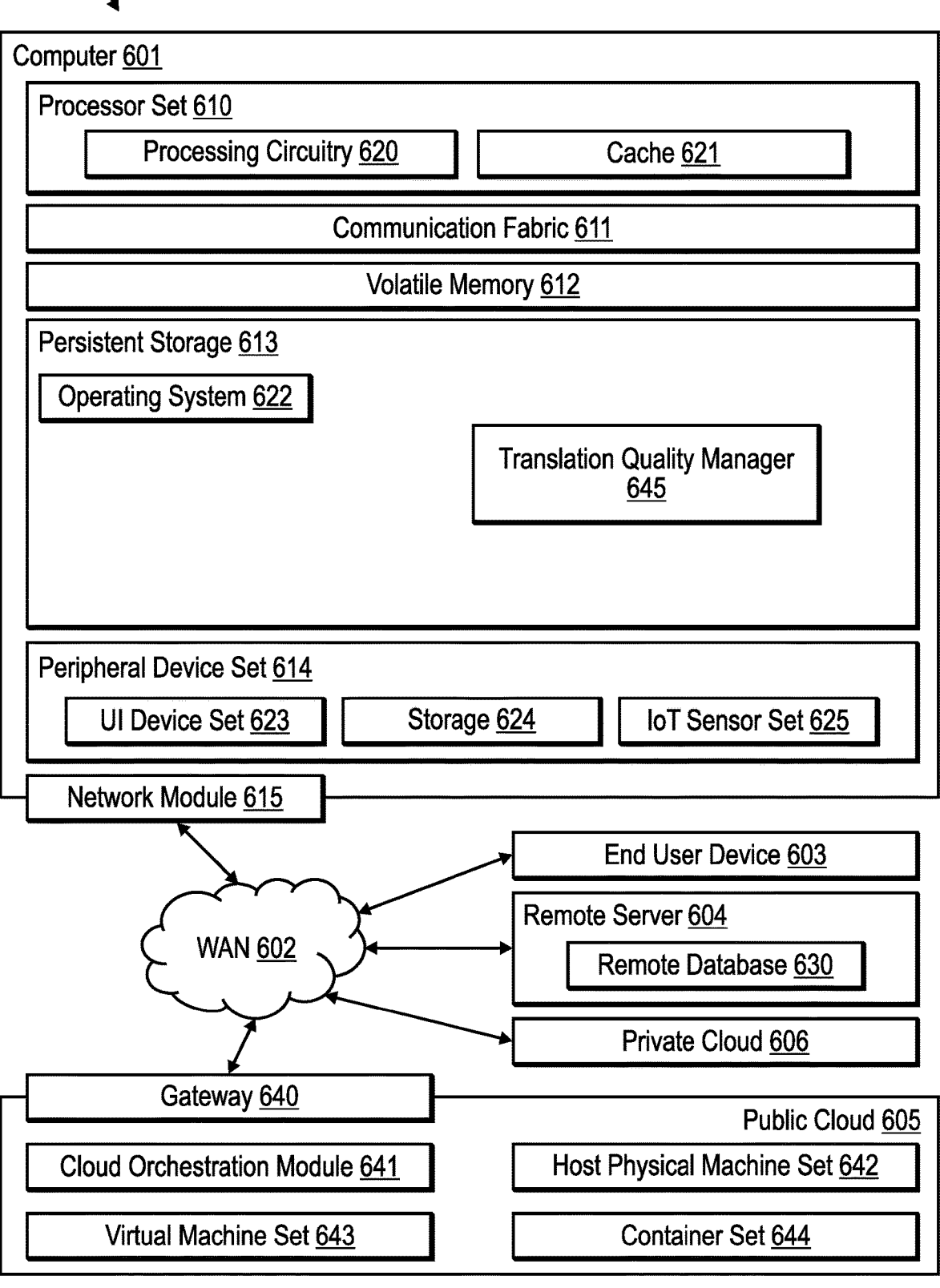
FIG. 6 illustrates a computing environment in which the components of FIG. 1 may be implemented.

With respect to FIG. 6, computing environment 600 contains an example of an environment for the execution of at least some of the computer code involved in performing the inventive methods, such as the translation quality manager 645, to determine whether a translated word is appropriate. In addition to block 645, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and translation quality manager 645, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 645 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 645 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments.

Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The letter designators, such as i and j, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining whether to correct a translation, the computer program product comprises a computer readable storage medium having program instructions embodied therewith that when executed cause operations, the operations comprising:

a source language text parser processing a source document to determine instances of related text elements including a first text and second text in a source language;

inputting the first text and the second text into a source language text embedding module, specific to the source language, to produce a first text vector and a second text vector;

a target language text parser for processing a target document comprising a translation of the source document to a target language to determine instances of related text elements including translated first text and translated second text comprising the first text and the second text, respectively, translated to the target language;

inputting the translated first text and the translated second text into a target language text embedding module, specific to the target language, to produce a translated first text vector and a translated second text vector;

calculating a source similarity score indicating a similarity between the first text vector and the second text vector;

calculating a target similarity score between the-translated first text vector and the translated second text vector;

determining whether the translation of the first text to the translated first text is of an inappropriate translation quality based on the source similarity score and the target similarity score; and indicating the inappropriate translation quality in response to determining the inappropriate translation quality.

2. The computer program product of claim 1, wherein the first text and the second text are located in adjacent structured elements in the source document;

wherein the translated first text and the translated second text are located in adjacent structured elements in the target document, wherein the operations of calculating the source similarity score and the target similarity score are performed for multiple instances of text elements located in adjacent structured elements in the source document and multiple instances of translated text elements located in adjacent structured elements in the target document.

3. The computer program product of claim 1, wherein the operations further comprise:

generating a translation quality alert for the translation of the first text to the translated first text, in response to indicating the inappropriate translation quality, to prompt a person to correct the translation of the translated first text.

4. The computer program product of claim 1, wherein the operations further comprise:

determining an alternative translation of the first text, to the target language, different from the translated first text in response to indicating the inappropriate translation quality;

calculating an alternative target similarity score between the alternative translation and the translated second text;

determining whether the translation of the first text to the alternative translation is of inappropriate translation quality based on the source similarity score and the alternative target similarity score; and changing the translated first text to the alternative translation in response to determining that the alternative translation has an appropriate translation quality based on the source similarity score and the alternative target similarity score.

5. The computer program product of claim 1, wherein the source similarity score comprises a cosine similarity between the first text vector and the second text vector, and wherein the target similarity score comprises a cosine similarity between the first translated text vector and the second translated text vector.

6. The computer program product of claim 1, wherein the determining whether the translation is of the inappropriate translation quality comprises:

determining an absolute value of a difference between the source similarity score and the target similarity score; and determining whether the absolute value of the difference is greater than a threshold, wherein the determination is made of the inappropriate translation quality in response to the absolute value of the difference being less than the threshold.

7. The computer program product of claim 1, wherein the first text and the second text are in element nodes in a source document comprising a structured document in the source language, wherein the translated first text and the translated second text are in element nodes of a target document comprising a structured document in the target language, wherein the source document and the target document have same structural element nodes, wherein the first text and the first translated text are in a first same structural element node in the source and the target documents, and wherein the second text and the second translated text are in a second same structural element node in the source and the target documents.

8. The computer program product of claim 1, wherein the second text provides context for the first text and wherein the second translated text provides context for the first translated text.

9. The computer program product of claim 1, wherein the first text and the first translated text each comprise one word and the second text and the second translated text each comprise a phrase comprised of a plurality of words.

10. A system for determining whether to correct a translation, comprising:

a processor; and a computer readable storage medium having program instructions embodied therewith that when executed by the processor cause operations, the operations comprising:

a source language text parser processing a source document to determine instances of related text elements including a first text and second text in a source language;

inputting the first text and the second text into a source language text embedding module, specific to the source language, to produce a first text vector and a second text vector;

a target language text parser for processing a target document comprising a translation of the source document to a target language to determine instances of related text elements including translated first text and translated second text comprising the first text and the second text, respectively, translated to the target language;

inputting the translated first text and the translated second text into a target language text embedding module, specific to the target language, to produce a translated first text vector and a translated second text vector;

calculating a source similarity score indicating a similarity between the first text vector and the second text vector;

calculating a target similarity score between the translated first text and the translated second text;

determining whether the translation of the first text to the translated first text is of an inappropriate translation quality based on the source similarity score and the target similarity score; and indicating the inappropriate translation quality in response to determining the inappropriate translation quality.

11. The system of claim 10, wherein the operations further comprise:

determining an alternative translation of the first text, to the target language, different from the translated first text in response to indicating the inappropriate translation quality;

calculating an alternative target similarity score between the alternative translation and the translated second text;

determining whether the translation of the first text to the alternative translation is of inappropriate translation quality based on the source similarity score and the alternative target similarity score; and changing the translated first text to the alternative translation in response to determining that the alternative translation has an appropriate translation quality based on the source similarity score and the alternative target similarity score.

12. The system of claim 10, wherein the source similarity score comprises a cosine similarity between the first text vector and the second text vector, and wherein the target similarity score comprises a cosine similarity between the first translated text vector and the second translated text vector.

13. The system of claim 10, wherein the determining whether the translation is of the inappropriate translation quality comprises:

determining an absolute value of a difference between the source similarity score and the target similarity score; and determining whether the absolute value of the difference is greater than a threshold, wherein the determination is made of the inappropriate translation quality in response to the absolute value of the difference being less than the threshold.

14. The system of claim 10, wherein the first text and the second text are in element nodes in a source document comprising a structured document in the source language, wherein the translated first text and the translated second text are in element nodes of a target document comprising a structured document in the target language, wherein the source document and the target document have same structural element nodes, wherein the first text and the first translated text are in a first same structural element node in the source and the target documents, and wherein the second text and the second translated text are in a second same structural element node in the source and the target documents.

15. The system of claim 10, wherein the second text provides context for the first text and wherein the second translated text provides context for the first translated text.

16. A computer implemented method for determining whether to correct a translation, comprising:

a source language text parser processing a source document to determine instances of related text elements including a first text and second text in a source language;

inputting the first text and the second text into a source language text embedding module, specific to the source language, to produce a first text vector and a second text vector;

a target language text parser for processing a target document comprising a translation of the source document to a target language to determine instances of related text elements including translated first text and translated second text comprising the first text and the second text, respectively, translated to the target language;

inputting the translated first text and the translated second text into a target language text embedding module, specific to the target language, to produce a translated first text vector and a translated second text vector;

calculating a source similarity score indicating a similarity between the first text vector and the second text vector;

calculating a target similarity score between the translated first text vector and the translated second text vector;

determining whether the translation of the first text to the translated first text is of an inappropriate translation quality based on the source similarity score and the target similarity score; and indicating the inappropriate translation quality in response to determining the inappropriate translation quality.

17. The method of claim 16, further comprising:

determining an alternative translation of the first text, to the target language, different from the translated first text in response to indicating the inappropriate translation quality;

calculating an alternative target similarity score between the alternative translation and the translated second text;

determining whether the translation of the first text to the alternative translation is of inappropriate translation quality based on the source similarity score and the alternative target similarity score; and changing the translated first text to the alternative translation in response to determining that the alternative translation has an appropriate translation quality based on the source similarity score and the alternative target similarity score.

18. The method of claim 16, wherein the source similarity score comprises a cosine similarity between the first text vector and the second text vector, and wherein the target similarity score comprises a cosine similarity between the first translated text vector and the second translated text vector.

19. The method of claim 16, wherein the determining whether the translation is of the inappropriate translation quality comprises:

determining an absolute value of a difference between the source similarity score and the target similarity score; and determining whether the absolute value of the difference is greater than a threshold, wherein the determination is made of the inappropriate translation quality in response to the absolute value of the difference being less than the threshold.

20. The method of claim 16, wherein the first text and the second text are in element nodes in a source document comprising a structured document in the source language, wherein the translated first text and the translated second text are in element nodes of a target document comprising a structured document in the target language, wherein the source document and the target document have same structural element nodes, wherein the first text and the first translated text are in a first same structural element node in the source and the target documents, and wherein the second text and the second translated text are in a second same structural element node in the source and the target documents.

\* \* \* \* \*